Dec. 3, 1935.  W. R. HARDING  2,023,365
AUTOMATIC ALTERNATING CURRENT WELDER
Filed Nov. 25, 1933
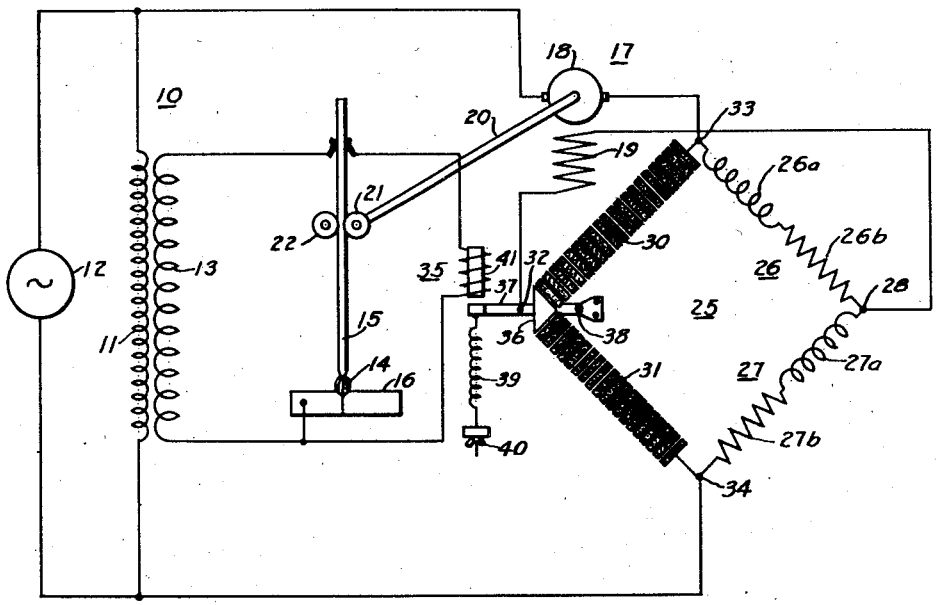
WITNESSES:
INVENTOR
William R. Harding
BY
ATTORNEY Patented Dec. 3, 1935

2,023,365

UNITED STATES PATENT OFFICE 2,023,365

AUTOMATIC ALTERNATING-CURRENT WELDER

William R. Harding, Wilkinsburg, Pa., assignor to Westinghouse Electric & Manufacturing Company, East Pittsburgh, Pa., a corporation of Pennsylvania Application November 25, 1933, Serial No. 699,749

7 Claims. (Cl. 219—8)

My invention relates generally to arc-welding apparatus and it has particular relation to automatic alternating-current arc-welding apparatus.

The object of my invention, generally stated, is to provide automatic arc-welding apparatus which shall be simple and efficient in operation and which may be readily and economically manufactured and installed.

The principal object of my invention is to provide for feeding a welding electrode in accordance with a variable characteristic of a welding arc.

Another important object of my invention is to provide for maintaining an alternating-current arc between a welding electrode and work and feeding the electrode in accordance with the arc voltage to maintain the arc voltage substantially constant.

Another object of my invention is to provide for controlling the amount and direction of current flow through the field or armature windings of a series-type motor disposed to feed a welding electrode in accordance with an alternating-current arc voltage to maintain the arc voltage substantially constant.

Other objects of my invention will, in part, be obvious and, in part, appear hereinafter.

My invention accordingly is disclosed in the embodiment hereof shown in the accompanying drawing and comprises the features of construction, combination of elements and arrangement of parts which will be exemplified in the construction hereinafter set forth, the scope of the application of which will be indicated in the appended claims.

For a more complete understanding of the nature and scope of my invention reference may be had to the following detailed description taken in connection with the accompanying drawing, in which the single figure diagrammatically represents a concrete embodiment of my invention.

Referring now particularly to the drawing, the reference character 10 designates generally a welding transformer having a primary winding 11 which may be connected to an alternating-current source 12, such as a source having a frequency of 25 or 60 cycles. The transformer 10 is also provided with a secondary winding 13 which is connected to maintain an arc 14 between a welding electrode 15 and work 16 on which a welding operation is to be performed. The welding electrode 15 may either be of the metallic type which is rapidly fused, or it may be of the carbon type which is slowly consumed while the welding operation is being performed.

In order to feed the welding electrode 15, a motor, shown generally at 17, of the alternating-current series type, is provided having an armature winding 18 and a series field winding 19. As illustrated in the drawing, the armature winding 18 may be connected by means of a drive shaft 20 to a feed roller 21 which is arranged to cooperate with an idling roller 22 for feeding the welding electrode 15 which is positioned therebetween.

It is desirable to regulate the rate at which the welding electrode 15 is fed by the armature 18 in such manner that the welding arc 14 may be struck and maintained in order to perform the welding operation. In order to effect this control I have provided for varying the amount of current flow through both the armature winding 18 and the series field winding 19, as well as for reversing the relative direction of current flow through one of these windings in order to obtain varying speeds and a reversal in the direction of rotation of the armature winding 18. It is well known to those skilled in the art that the armature winding 18 and the field winding 19 should be connected in series circuit relation in order that the flux generated by the field winding 19 will be in phase with the current flowing through the armature winding 18. When this relation exists, the motor 17 will be enabled to develop the torque necessary to effect its operation and to feed the welding electrode 15 to maintain the arc 14.

In order to regulate and reverse the current flow through one of the windings of the motor 17, a regulator, shown generally at 25, is provided which comprises a Wheatstone bridge formed by two parallel circuits, one comprising impedances 26 and 27 connected together at junction-point 28, and the other comprising carbon piles 30 and 31, connected together at junction-point 32. As illustrated in the drawing, the impedance 26 and the carbon pile 30 are connected together at junction-point 33 while the remaining impedance 27 and carbon pile 31 are connected together at junction-point 34.

In the embodiment of the invention illustrated in the drawing and described herein, the series field winding 19 is connected across the bridge circuit at the junction-points 32 and 28, while the armature winding 18 is connected in series circuit relation with the bridge circuit at the junction-point 33. The remaining terminal of the armature winding 18 and the terminal 34 of the bridge circuit may be connected to the alternating-current source 12 or to a separate source, if so desired. While the series field winding 19 has been illustrated as being connected across the bridge circuit and the armature winding 18 has been illustrated as being connected in series circuit relation with the bridge circuit, it will be readily apparent that the connections of these windings may be interchanged with no change in the functioning of the motor 17. It will also be readily apparent that the same relation between the current in the armature winding 18 and the flux generated by the series field winding 19 will be maintained when either connection is used.

Either one or the other of the carbon piles 30 or 31 of the regulator 25 is compressed in order to regulate and reverse the current flow through the series field winding 19. A relay mechanism, shown generally at 35, is arranged to control the operation of the regulator 25. The relay mechanism 35 may comprise a wedge 36 which may be carried by an armature 37 that is fulcrumed at 38. The wedge 36 is positioned between the ends of the carbon piles 30 and 31, as illustrated, in order to compress either of them, depending upon the direction of movement of the armature 37. A biasing spring 39, the tension of which may be adjusted by means of a thumb nut 40, is provided for urging the armature 37 in one direction while a winding 41, connected across the arc 14, to the welding electrode 15 and the work 16, as shown, is provided for urging the armature 37 in the other direction.

The combination of the carbon piles 30 and 31 and the relay 35, which is responsive to the voltage of the arc 14, may be constructed into what is known to those skilled in the art as a regulator of the carbon pile type. This regulator may be of the relatively high-speed vibrating type which will maintain an average value of current flow by governing the degree of compression of the carbon piles 30 and 31 for regulating the speed of the motor 17 to maintain the desired arc voltage.

As illustrated in the drawing, each of the impedances 26 and 27 comprises, respectively, inductors 26a and 27a and resistors 26b and 27b. When the carbon pile 30 is compressed, as when the electrode is fed forwardly, current will flow through the armature winding 18, carbon pile 30, series field winding 19, and impedance 27. It will be observed that the impedance 26 is connected in parallel circuit relation at this time with the circuit including the series field winding 19 and that a portion of the total current in the armature winding 18 flows through the impedance 26 and does not flow through the series field winding 19.

In order to provide the proper phase relationship between the flux generated by the series field winding 19 and the current in the armature winding 18, the ratio of resistances of the two beforementioned parallel circuits to their respective inductances is made equal at the point of maximum torque demand. Under this condition, the flux generated by the series field winding 19 and the current in the armature winding 18 will be in phase at the instant when the maximum torque is required. While there may be some shifting of the phase relation between the flux and current when the point of maximum torque demand is departed from, still the phase relation between the flux and current will not be altered to such an extent that proper operation of the motor 17 may not be maintained.

In like manner, the relation between the inductance and resistance of impedance 27 may be proportioned with respect to the circuit with which it is connected in parallel, when the carbon pile 31 is compressed, so that the same phase relation between the flux generated by the series field winding 19 and the current in the armature winding 18 will be maintained in accordance with the relation set forth hereinbefore.

Since carbon piles 30 and 31 are inherently non-inductive, there will be a minimum of phase shift between the currents in the armature winding 18 and the series field winding 19. The degree of compensation required to correct for the phase shift will thus be correspondingly decreased from that required if some inductive means were employed to obtain the desired control.

In operation, assuming that the welding electrode 15 is out of engagement with the work 16, a relatively high voltage will exist therebetween. This high voltage will be applied to the winding 41 of the relay 35, which will attract the armature 37 and compress the carbon pile 30, at the same time relieving the compression from the carbon pile 31. Current will then flow through the armature winding 18, the carbon pile 30, series field winding 19 and impedance 27. A certain proportion of the current will also flow through the impedance 26.

Under these conditions, the relation between the current flow in the armature winding 18 and the flux generated by the series field winding 19 will be such as to cause the motor 17 to feed the welding electrode 15 toward the work 16 until it engages therewith. As soon as the welding electrode 15 engages the work 16, the voltage which is applied to the winding 41 of the relay 35 will be reduced to such a value that the winding 41 will no longer attract the armature 37, and the spring 39 will then cause the compression of the carbon pile 31 through a corresponding movement of the armature 37. At the same time, the compression of the carbon pile 30 will be relieved. Current will then flow through the armature winding 18, impedance 26, series field winding 19 and carbon pile 31 and a certain proportion of it will flow through the impedance 27.

Under these conditions it will be observed that the current flowing in the series field winding 19 is reversed with respect to its former direction, while the current flow through the armature winding 18 is maintained in the same direction. The motor 17 will thereupon reverse and withdraw the welding electrode 15.

It will be readily understood that the withdrawal of the welding electrode 15 is accompanied by an increase in the voltage which is applied to the winding 41 of the relay 35, and, as a result, the armature 37 will be attracted to relieve the compression on the carbon pile 31 and to apply a compressive force to the carbon pile 30. The current flow through the series field winding 19 will again be reversed to flow in the original direction as hereinbefore described, and the welding electrode 15 will be forwardly fed at a rate which depends upon the degree of compression of the carbon pile 30. Since this compression is regulated by the voltage of the arc 14, it will be readily apparent that the motor 17 may be caused to feed the welding electrode 15 at such a rate that the arc voltage will be maintained substantially constant.

The relay 35, in response to departures from a predetermined arc voltage, will alter the degree of compression of the carbon piles 30 and 31, as will be readily understood, between the limits of maximum and minimum compression to correspondingly regulate the amount and direction of current flow through the series field winding 19 so that the electrode 15 will be fed so as to maintain the predetermined arc voltage. Different arc voltages may be maintained by varying the tension of the spring 39.

It will be apparent that the carbon pile 31 may be omitted and in place of it a single set of contacts may be used. Under certain conditions the carbon pile 31 is effective only in reversing the direction of rotation of the motor 17, and this action may be brought about at a fixed speed, while it is desirable to provide varying speeds in the forward direction to effect more accurate control of the arc voltage.

While the foregoing embodiment of my invention has been illustrated and described in connection with an alternating-current source which is used for not only maintaining the welding arc but also for effecting the control of the electrode feed motor, it will be readily apparent that a system of control, embodying my invention, may be used in connection with direct-current arc-welding systems in which a direct-current welding arc is maintained and direct current is used for energizing the feed motor. It will also be understood that a current source for the motor 17 may be provided that is separate from the source 12. However, since in present practice only a single source is used, a corresponding arrangement has been illustrated and described herein.

Since certain further changes may be made in the above construction and different embodiments of the invention may be made without departing from the scope thereof, it is intended that all matter contained in the above description or shown in the accompanying drawing shall be interpreted as illustrative and not in a limiting sense.

I claim as my invention:

1. Automatic arc-welding apparatus comprising, in combination, means for feeding a welding electrode, a motor including armature and field windings connected to drive said feeding means, a Wheatstone bridge circuit connected in series-circuit relation with one of said windings and to a current source, the remaining winding of said motor being connected across said bridge circuit, and regulating means connected to be responsive to the arc voltage for controlling said bridge circuit to regulate the current flow through said winding connected across the bridge in accordance with changes in the arc voltage.

2. Automatic arc-welding apparatus comprising, in combination, means for feeding a welding electrode, a motor including armature and field windings connected to drive said feeding means, a balanced circuit connected in series-circuit relation with one of said windings and to a current source, the other of said windings being connected across said balanced circuit, means for controlling said balanced circuit, and regulating means connected to be responsive to a variable characteristic of the welding arc for operating said last-named means.

3. Automatic arc-welding apparatus comprising in combination, means for feeding a welding electrode, a motor including armature and field windings connected to drive said feeding means, a balanced circuit connected in series-circuit relation with one of said windings and to a current source, the other of said windings being connected across said balanced circuit, and regulating means connected to be responsive to the arc voltage for controlling said balanced circuit.

4. Automatic arc-welding apparatus comprising, in combination, means for feeding a welding electrode, a motor including armature and field windings connected to drive said feeding means, a non-inductive balanced circuit connected in series-circuit relation with one of said windings, the other of said windings being connected across said balanced circuit, and regulating means connected to be responsive to a variable characteristic of the welding arc for controlling said balanced circuit.

5. Automatic arc-welding apparatus comprising, in combination, electrode-feeding means, a motor provided with armature and field windings and connected to drive said feeding means, a resistor and a carbon pile connected in parallel-circuit relation and in series-circuit relation with one of said windings, the other of said windings being electrically connected between said resistor and said carbon pile thereby causing the current flow through the other of said windings to vary in accordance with the current flow through said resistor and carbon pile, and control means connected to be responsive to a variable characteristic of the welding arc for varying the resistance of said carbon pile.

6. Automatic arc-welding apparatus comprising, in combination, electrode-feeding means, a motor provided with armature and field windings, and connected to drive said feeding means, a Wheatstone bridge circuit connected in series-circuit relation with one of said windings and across said other winding, a pair of adjacent arms of said bridge circuit comprising carbon piles, means for compressing either of said carbon piles, and regulating means connected to be responsive to a characteristic of the arc for operating said last-named means.

7. Automatic arc-welding apparatus comprising, in combination, means for feeding an electrode to work on which a welding operation is to be performed, circuit means for connecting the electrode and work to a current source, a motor including armature and field windings connected to drive said feeding means, a Wheatstone bridge circuit connected in series-circuit relation with one of said windings and to a source of alternating current, the other of said windings being connected across said bridge circuit, one pair of arms of said bridge circuit comprising resistors and the other pair of arms comprising carbon piles, means for compressing either of the carbon piles, to vary the current flow through said other winding, and regulating means connected to be responsive to a characteristic of the arc for operating said last-named means.

WILLIAM R. HARDING.